(12) United States Patent
Weiss et al.

(10) Patent No.: US 8,509,569 B2
(45) Date of Patent: Aug. 13, 2013

(54) OPTIMIZATION OF IMAGE PROCESSING USING MULTIPLE PROCESSING UNITS

(75) Inventors: Ben Weiss, Carpinteria, CA (US); Doug Ahmann, Woodbury, MN (US)

(73) Assignee: Apple Inc., Cupertino, CA (US)

( * ) Notice: Subject to any disclaimer, the term of this patent is extended or adjusted under 35 U.S.C. 154(b) by 1170 days.

(21) Appl. No.: 12/029,448

(22) Filed: Feb. 11, 2008

(65) Prior Publication Data

US 2009/0202173 A1    Aug. 13, 2009

(51) Int. Cl.
*G06K 9/54*    (2006.01)
*G06K 9/60*    (2006.01)
*G05B 19/18*   (2006.01)

(52) U.S. Cl.
USPC .............................................. 382/302; 700/2

(58) Field of Classification Search
USPC ........... 382/304, 325; 707/999.201–999.203; 715/255
See application file for complete search history.

(56) References Cited

U.S. PATENT DOCUMENTS

| | | | |
|---|---|---|---|
| 4,876,651 A | 10/1989 | Dawson et al. | |
| 5,357,604 A | 10/1994 | San et al. | |
| 5,377,016 A | 12/1994 | Kashiwagi et al. | |
| 5,436,734 A * | 7/1995 | Yamauchi et al. | 358/448 |
| 5,630,075 A | 5/1997 | Joshi et al. | |
| 5,657,478 A | 8/1997 | Recker et al. | |
| 5,754,812 A | 5/1998 | Favor et al. | |
| 5,945,997 A | 8/1999 | Zhao et al. | |
| 6,016,151 A | 1/2000 | Lin | |
| 6,088,701 A | 7/2000 | Whaley et al. | |
| 6,148,372 A | 11/2000 | Mehrotra et al. | |
| 6,269,390 B1 | 7/2001 | Boland | |
| 6,578,197 B1 | 6/2003 | Peercy et al. | |
| 6,636,214 B1 | 10/2003 | Leather et al. | |
| 6,798,421 B2 | 9/2004 | Baldwin | |
| 6,958,757 B2 | 10/2005 | Karlov | |
| 6,990,230 B2 | 1/2006 | Piponi | |
| 6,995,770 B2 | 2/2006 | Ngai | |
| 7,218,291 B2 | 5/2007 | Abdalla et al. | |
| 7,231,632 B2 | 6/2007 | Harper | |

(Continued)

FOREIGN PATENT DOCUMENTS

WO    WO 2008118065    10/2008

OTHER PUBLICATIONS

Styne, B.A., Command history in a reversible painting history, Computer Animation, Apr. 25-27, 1990, pp. 149-164.*

(Continued)

*Primary Examiner* — Yubin Hung
(74) *Attorney, Agent, or Firm* — Robert C. Kowert; Meyertons, Hood, Kivlin, Kowert & Goetzel, P.C.

(57) ABSTRACT

Some embodiments provide an image editing application that utilizes at least two processing units to efficiently process an image with multiple effects after at least one of the effects modified from the image. Some such embodiments maintain a queue for identifying each of the effects to reprocess. Some embodiments determine a modified ordering for the effects in the queue based on criteria that is related to reducing data exchanges between the processing units when applying the effects. From the modified ordering, a first processing unit applies a first set of the effects before passing resulting data to a second processing unit for application of a second set of the effects. The second processing unit applies a second set of effects to produce the image with the multiple effects and the at least one effect removed or modified.

25 Claims, 13 Drawing Sheets

(56) References Cited

U.S. PATENT DOCUMENTS

| | | | |
|---|---|---|---|
| 7,528,840 B1 | 5/2009 | Carson et al. | |
| 8,018,465 B2 | 9/2011 | Carson et al. | |
| 8,136,107 B2* | 3/2012 | Zaks | 717/160 |
| 2001/0041018 A1* | 11/2001 | Sonoda | 382/275 |
| 2003/0120709 A1* | 6/2003 | Pulsipher et al. | 709/106 |
| 2005/0102364 A1* | 5/2005 | Ozzie et al. | 709/207 |
| 2005/0231516 A1* | 10/2005 | Zimmer | 345/531 |
| 2007/0091100 A1* | 4/2007 | Brothers et al. | 345/506 |
| 2007/0182746 A1 | 8/2007 | Jiao et al. | |
| 2008/0012874 A1 | 1/2008 | Spangler et al. | |
| 2008/0303833 A1 | 12/2008 | Swift et al. | |
| 2008/0303835 A1 | 12/2008 | Swift et al. | |
| 2009/0113404 A1* | 4/2009 | Takayama et al. | 717/149 |
| 2009/0160867 A1* | 6/2009 | Grossman | 345/522 |
| 2009/0189897 A1 | 7/2009 | Abbas | |
| 2010/0185718 A1* | 7/2010 | Archer et al. | 709/201 |

OTHER PUBLICATIONS

Zhang et al., Implementing Undo-Redo in PDF studio using object-oriented design pattern, Proceedings of the 36th International Conference on Technology of Object-Oriented Languages and Systems (TOOLS—Asia 2000); Oct. 30-Nov. 4, 2000, pp. 58-64.*

Zhou et al., Object-based nonlinear Undo model, COMPSAC'97, Aug. 1997, pp. 50-55.*

Xu et al., Research on Internet-based real-time collaborative image editing system, Int'l Conf. Computer supported cooperative work in design proceedings, (2004), vol. 2, pp. 522-527.*

Portions of prosecution history of U.S. Appl. No. 10/677,574, Mar. 24, 2009, Carson, Kenneth M., et al.

Portions of prosecution history of U.S. Appl. No. 12/416,080, Jul. 14, 2011, Carson, Kenneth M., et al.

Portions of prosecution history of U.S. Appl. No. 12/021,295, Nov. 10, 2011, Abbas, Gregory B.

* cited by examiner

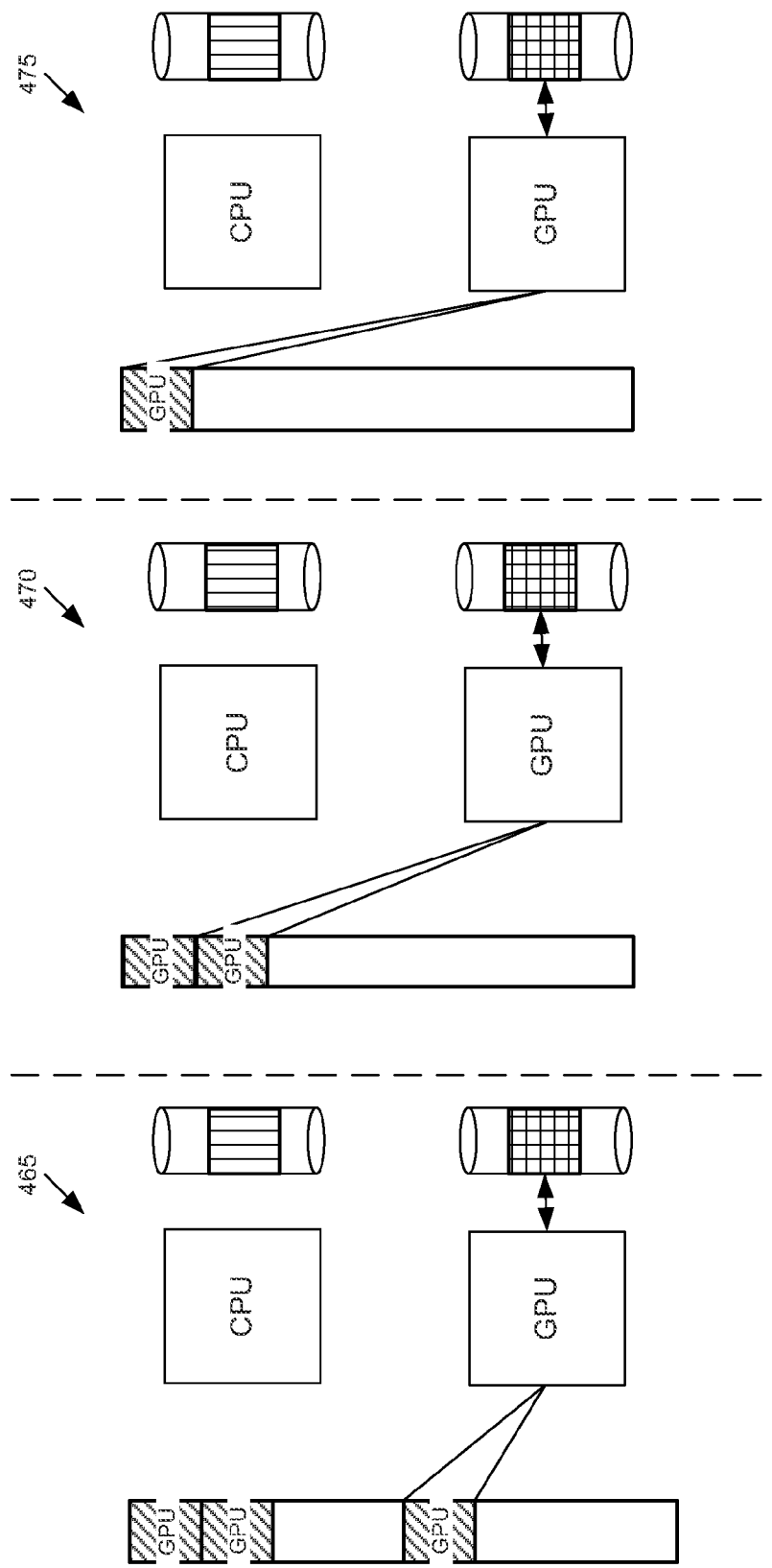

OPTIMIZATION OF IMAGE PROCESSING USING MULTIPLE PROCESSING UNITS

FIELD OF THE INVENTION

The invention is directed towards image editing. Specifically, the invention is directed towards optimizing image processing when utilizing multiple processing units.

BACKGROUND OF THE INVENTION

Image editing applications provide various image editing effects to modify, enhance, adjust, and combine digital images. These effects are implemented and applied to an image using brushes, filters, or scripts of the image editing application. In many instances, the modifications are displayed in real time as each effect is applied to the image.

Image editing applications also permit users the ability to remove a previously applied effect, toggle on and off an effect, or modify a parameter of a previously applied effect. Such functionality is helpful as users often overlay multiple effects and the combination of effects sometimes produces an undesired result causing the user to remove, disable, or modify a previously applied effect. In such cases, the image editing application reproduces the image displayed on screen. The reproduced image renders the previous image with all the retained effects applied and the removed or disabled effect omitted or with the modified parameter of the adjusted effect applied. In this manner, users can step backwards through each of their previously applied effects correcting results of particular effects without having to manually re-specify each of the other effects they wish to retain.

To provide such functionality, prior art image editing applications track the effects as they are applied to the original image. In tracking the effects, some image editing application generate and store a different rendered frame after each effect is applied to the original image. Specifically, some prior art image editing applications keep a cache of every intermediate result in the effects pipeline in order to allow the ability to revert back to any such result. Such an approach consumes excessive amounts of memory and provides unacceptable performance when several effects are applied to an image.

Other image editing applications maintain an effects queue to record each specified effect and their associated parameters. In this manner, after a previously applied effect is removed, disabled, or modified, the original image is reprocessed with every function still within the effects queue to reproduce the image with the effect removed or modified. These image editing applications provide better memory savings at the cost of having to reprocess every effect in the effects queue each time a previously applied effect is removed or modified. For a sufficient number of effects, these image editing applications become processor constrained. Specifically, as image editing applications depend on both a generic central processing unit (i.e., CPU) and a graphics processor (GPU) to process the set of effects, the continual passing of data between the CPU and the GPU creates a bottleneck that greatly reduces the overall performance of the computer system while greatly increasing the time needed by the computer system to reprocess all the effects that have not been removed, disabled, or modified.

As a result, prior art image editing applications are only able to provide such undo, toggling, or modify functionality at the cost of excessive memory requirements or excessive processing requirements. Therefore, there is a need to provide such functionality in an image editing application in a manner that reduces the memory and processing requirements. Specifically, there is a need to provide such functionality such that processing or memory resources of a computer system are not overwhelmed when providing the undo or modify functionality.

SUMMARY OF THE INVENTION

Some embodiments provide an image editing application that utilizes at least two processing units with different processing capabilities to efficiently process an image with multiple effects after at least one of the effects is removed or modified from the image. Some such embodiments maintain a queue for identifying each of the effects to reapply. Some embodiments determine a modified ordering for the effects in the queue based on criteria that is related to reducing data exchanges between the processing units when reapplying the effects. From the modified ordering, a first processing unit determines whether the removed effect or modified effect impacts a first set of effects. If impacted, the first processing unit applies a first set of the effects before passing resulting data to a second processing unit for application of a second set of the effects. If not impacted, the first processing unit passes previously processed data containing the first set of effects to the second processing unit. The second processing unit applies a second set of effects to produce the image with the multiple effects and the at least one effect removed or modified.

BRIEF DESCRIPTION OF THE DRAWINGS

The novel features of the invention are set forth in the appended claims. However, for purpose of explanation, several embodiments of the invention are set forth in the following figures.

FIG. 4B further illustrates the efficient reprocessing of effects by grouping and processing CPU effects prior to processing GPU effects.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Overview

Some embodiments provide an image editing application that utilizes at least two processing units with different processing capabilities to efficiently process an image with multiple effects after at least one of the effects is removed or modified from the image. Some such embodiments maintain a queue for identifying each of the effects to reapply. Some embodiments determine a modified ordering for the effects in the queue based on criteria that is related to reducing data exchanges between the processing units when reapplying the effects. From the modified ordering, a first processing unit determines whether the removed effect or modified effect impacts a first set of effects. If impacted, the first processing unit applies a first set of the effects before passing resulting data to a second processing unit for application of a second set of the effects. If not impacted, the first processing unit passes previously processed data containing the first set of effects to the second processing unit. The second processing unit applies a second set of effects to produce the image with the multiple effects and the at least one effect removed or modified.

Several more detailed embodiments of the invention are described in the sections below. Section II describes the defining and redefining of effects within an image editing application of some embodiments. Next, Section III describes an optimized data flow and processes performed by some embodiments to overcome some of the various bottlenecks involved in efficiently reprocessing an image after a previously applied effect of the image is removed or modified. Section IV provides a more detailed image editing application that works in conjunction with some embodiments described in Sections II and III. Lastly, Section V describes a computer system with which some embodiments of the invention are implemented.

II. Defining and Redefining of Effects

Figure 1:
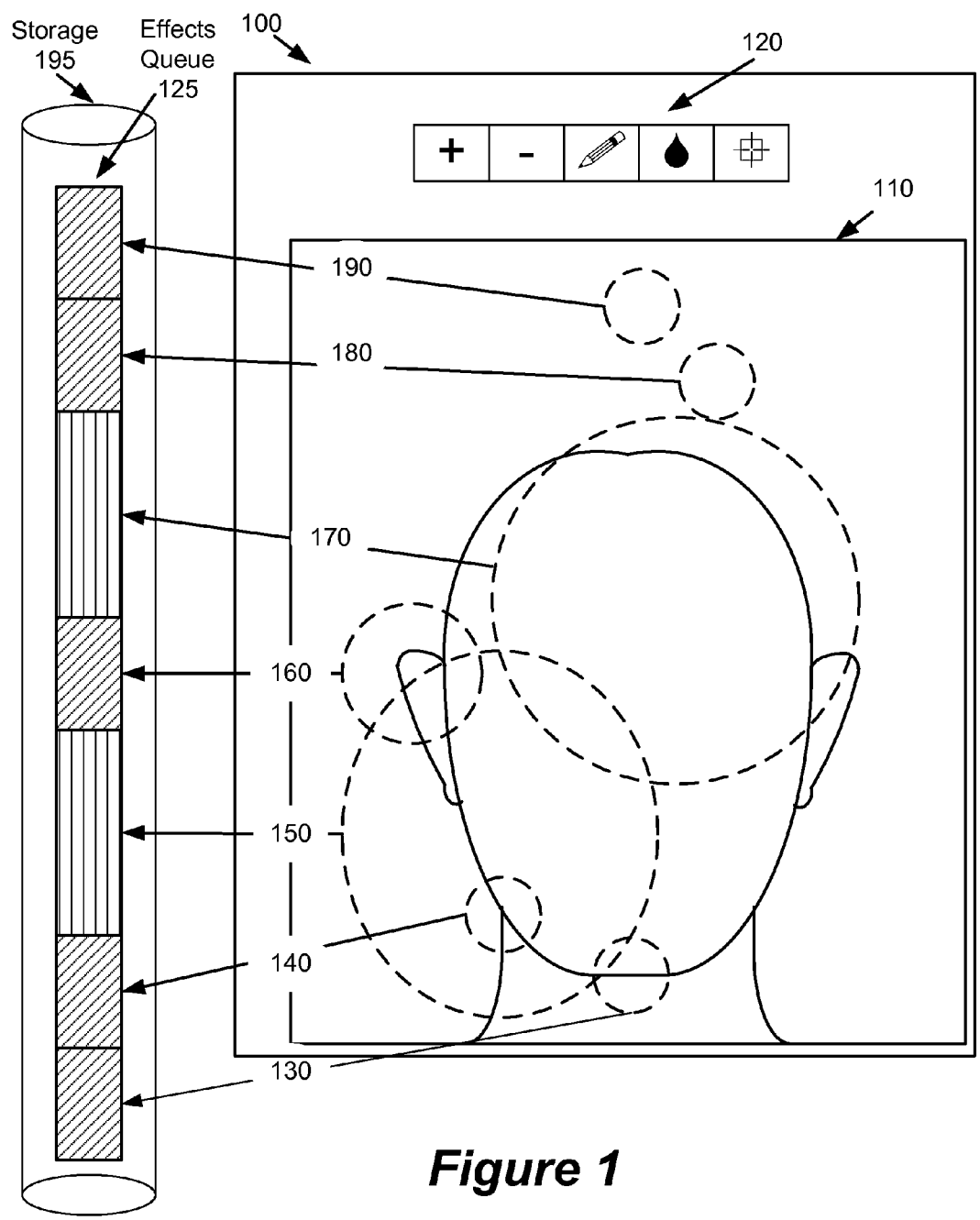
FIG. 1 illustrates an image editing application of some embodiments including an effects queue containing a set of effects applied to an image using image editing tools of the image editing application.

In some embodiments, users apply, remove, or modify one or more effects to an image using an image editing application. FIG. 1 illustrates an image editing application 100 of some embodiments. The image editing application 100 includes (1) a set of tools 110 to apply, remove, or modify the one or more effects, (2) a display window 120 to display the results produced after applying, removing, or modifying an effect, and (3) an effects queue 125 to maintain a list of effects that are applied to an image displayed within the display 120.

The set of tools 110 define various effects applicable to the image and the parameters associated with each effect. Each parameter alters an amount or quality of the effect and therefore the same effect may affect properties of the image differently. In some embodiments, the set of tools 110 provides users the ability to perform complex editing, such as applying multiple brushstrokes or filter operations to the image. Additionally, the set of tools 110 allows for selective adjustments to be made to the image such that a saturation or brightness of the image are affected as some examples.

Users may also manage the various effects via the set of tools 110. Such management functionality allows users the ability to remove, toggle on and off, or modify any of the previously applied effects in any order. When a user applies, removes, disables, or modifies an effect, the image within the display window 120 is updated to reveal the result produced by applying, removing, disabling or modifying the effect. Specifically, since the image editing applications of some embodiments do not store intermediate results that depict the image as it progresses through the specified set of effects, the image is continually reprocessed with some or all of the effects in order to render the final result when a previously applied effect is removed, disabled, or modified from the image. The time needed to reprocess the image increases linearly though some effects require more time than others to process.

In some embodiments, the image editing application 100 updates the display window 120 in real-time or near real-time to reflect the changes as they are applied to the image. However, real-time rendering of the display window 120 is often dependent upon the processing resources available on the computer system and the ability of these resources to process the effects so that changes appear on screen as they are applied. Therefore, the processing resources and amount of time needed may be sufficient to process an image with ten brushstrokes and ten filters (i.e., twenty effects), but an image with fifty brushstrokes and fifty filters (i.e., one hundred effects) will take five times longer to complete. To reduce the processing resources and time needed to process these operations, some embodiments optimally reprocess the effects in a manner that minimizes data exchanges and thus bottlenecks that would otherwise slow the reprocessing.

In FIG. 1, a user has specified seven distinct effects 130-190. The regions affected by each effect are illustrated using the dashed circles. Some effects specify overlapping regions and thus produce an effect atop other effects. For instance, the effect 140 specifies a region which is within the region modified by effect 150.

Some such effects are commutative or associative such that the result of a previously applied effect within the overlapping region will have no consequence on the result generated by the commutative or associated effect. For instance, if a user desires to brighten an image by a first amount and then rotate an object within the same image, the order in which these effects are applied to render the final result makes no difference. However, some effects are non-commutative or non-associative effects. These effects are dependent upon the results produced by other effects. When reapplying such non-commutative or non-associative effects, the order of effects application must be maintained in order to properly reproduce the result.

Some embodiments designate several operations as commutative or associative even though they are approximately, but not exactly, commutative or associative. This is a trade-off that some embodiments make in order to achieve the increased performance; slightly relaxing the strictness of commutativity or associativity allows much more flexibility in which operations can be reordered. In some embodiments, several operations are said to be commutative or associative when a user is unlikely to notice a difference between the results achieved by modifying the order of the operations. In some embodiments, two results are said to be the same when a user cannot perceive a noticeable difference between the two.

The image editing application 100 tracks the various effects applied to the image using the effects queue 125. The effects queue 125 maintains the list of effects 130-190 in the order in which the effects 130-190 were applied to the image. In some embodiments, the effects queue 125 is a stack. As such, the effect 130, which is the first effect applied to the image, is the first effect that is popped onto the stack. Similarly, the effect 150, which is the third effect applied to the image, is the third effect popped onto the stack. In some embodiments, each of effects 130-190 within the effects queue 125 is stored along with associated parameter data that specifies an amount or quality of the effect.

In some embodiments, the effects queue 125 is stored within a computer readable medium 195 such as a processing unit's associated cache, random access memory (RAM), or disk storage of the computer system. By storing the set of effects 130-190 in memory separate from the image, the set of effects 130-190 may be retained even after the image editing application 100 exits. Subsequent loading of the image within a different instance of the image editing application 100 will retain the set of effects 130-190 previously applied to the image as opposed to an image editing application that renders a composite image each time an effect is applied to the image.

In some embodiments, the set of effects 130-190 include effects 150 and 170 for processing by a first processing unit and effects 130, 140, 160, 180, and 190 for processing by a second processing unit. The image editing application 100 of some embodiments differentiates between the different types of effects in order to efficiently render the resulting image by leveraging the multiple processing resources available in a computer system. Modern computer systems include one or more central processing unit (CPUs) and one or more graphics processing units (GPUs). The CPU is the general processing unit of the computer system for executing the operating system, application programs, and other general instructions. The GPU is a dedicated graphics rendering device for processing, manipulating, and displaying graphics related operations. GPUs are optimized to efficiently compute various mathematical operations commonly used in graphics rendering.

Many of the various image editing effects contain instructions that can be processed by either the CPU or GPU of the computer system. Other effects are CPU specific effects. A transform operation is an example of an operation executable by both the CPU and GPU. In many instances, the GPU is often able to process this and other specific mathematical operations more efficiently than the CPU as the GPU contains dedicated hardware for the execution of these and other operations. Other GPU specific effects include adjustment effects such as saturation, brightness, contrast, etc. GPUs are increasingly becoming more powerful through new functionality such as customized vertex shaders, pixel shaders, hardware transform, and hardware lighting, etc. Accordingly, some embodiments provide different definitions as to what effects are classified as CPU specific and what effects are classified as GPU specific based on the functionality of the GPU and/or other processing units of the computer system. Other embodiments retain a common definition of CPU specific and GPU specific effects and logically emulate GPU functionality on the CPU when the GPU does not provide the necessary functionality.

CPU specific effects include sets of instructions that cannot be executed by the GPU. This is often due to instruction complexity or due to the non-linear nature of various computer-intensive operations used in conjunction with some of the image editing effects. As such, effects that contain forward-mapping operations, branching, testing, and comparison operations are best suited for CPU processing. For instance, a blemish removal effect is one example of an effect that is better suited for processing by the CPU as opposed to the GPU. Blemish removal involves complex algorithms that are not easily parallelized and that contain non-linear operations such as branching and testing operations for identifying and analyzing the blemish before modifying pixels within the image.

A GPU effect is an effect that is easily parallelized on the GPU. Such effects often perform the same operation on every pixel. Therefore, effects such as brightness adjustments, saturation adjustments, and blurring are some examples of GPU specific effects.

In some embodiments, the image that results from modifying the order of processing for several operations that are commutative or associative is not exactly the same, but is only practically the same, as the final result that would have been obtained if all the operations were processed in their original sequence. This is because certain CPU operations (e.g. cloning data from point A to point B with 50% opacity) are not perfectly commutative with certain nonlinear GPU effects such as gamma correction; nonlinear in this case refers to a polynomial or exponential function being applied to the data, even though the same operation is performed on each pixel; the operation is thus uniform, but not linear.

Accordingly, as mentioned above, some embodiments designate several operations as commutative or associative even though they are approximately, but not exactly, commutative or associative, in order to increase performance. Some embodiments designate several operations as commutative or associative when a user is unlikely to notice a difference between the results achieved by modifying the order of the operations. Since the reordering process is deterministic across hardware platforms in some embodiments, the results are stable despite this approximation. In other words, the optimal reordering is based on general CPU and GPU principles, but not specific graphics card models, so the results do not vary noticeably when the user switches from one machine to another.

III. Optimized Data Flow and Processes for Efficient Reprocessing of Effects

Some embodiments efficiently process a set of two or more effects by offloading some of the various graphics and image effects from a first processing unit (i.e., CPU) onto a second processing unit (i.e., GPU). Specifically, some embodiments intelligently manage the offloading of operations so that the amount of data exchanged between the first processing unit and the second processing unit and vice versa is minimized. In this manner, some embodiments reduce a primary bottleneck affecting the offloading of image processing operations and the real-time rendering performance of image editing application. This bottleneck results from the relatively slow bus speeds connecting the two processing units and the relatively slow memory access operations for reading and writing data from the memories associated with each processing unit. In some instances, the bottleneck associated with data transfer between the processing units is an asymmetric bottleneck. For example, uploading data from the CPU to GPU is a relatively quick operation when compared to the reading back of data from the GPU to the CPU.

In some embodiments, the intelligent offloading separates independent effects and processes those effects that consume relatively longer amounts of time with a first processing unit before processing quicker effects with a second processing unit. Moreover, intermediate data resulting from the processing by the first processing unit is buffered such that a change to a later effect that was processed by the second processing unit will not require the reprocessing of the intermediate data produced by the first processing unit. Instead, some embodiments need only reprocess those effects that were subsequently processed by the second processing unit, applying the reprocessed results of the second processing unit to the buffered intermediate data produced by the first processing unit.

Such intelligent offloading is particularly applicable to the undo, disable, or modify functionalities of an image editing application. In some embodiments, the undo functionality allows users the ability to remove any previously specified effect from a list of effects that have been applied to an image whereas the disable functionality removes the previously applied effect but retains the option of enabling the effect at any time during image editing. In some embodiments, the modify functionality allows users the ability to modify any parameters of any previously specified effect from the list of effects that have been applied to the image. Accordingly, each of the effects within the effects queue 125 is fully modifiable and each effect can be removed or adjusted in any order. Therefore, even though a user continues to add effects and modify regions of the image that were previously modified with an effect, the user is able to revert back to any of the previous changes and remove or modify such changes while retaining the after applied effects.

Figure 2:
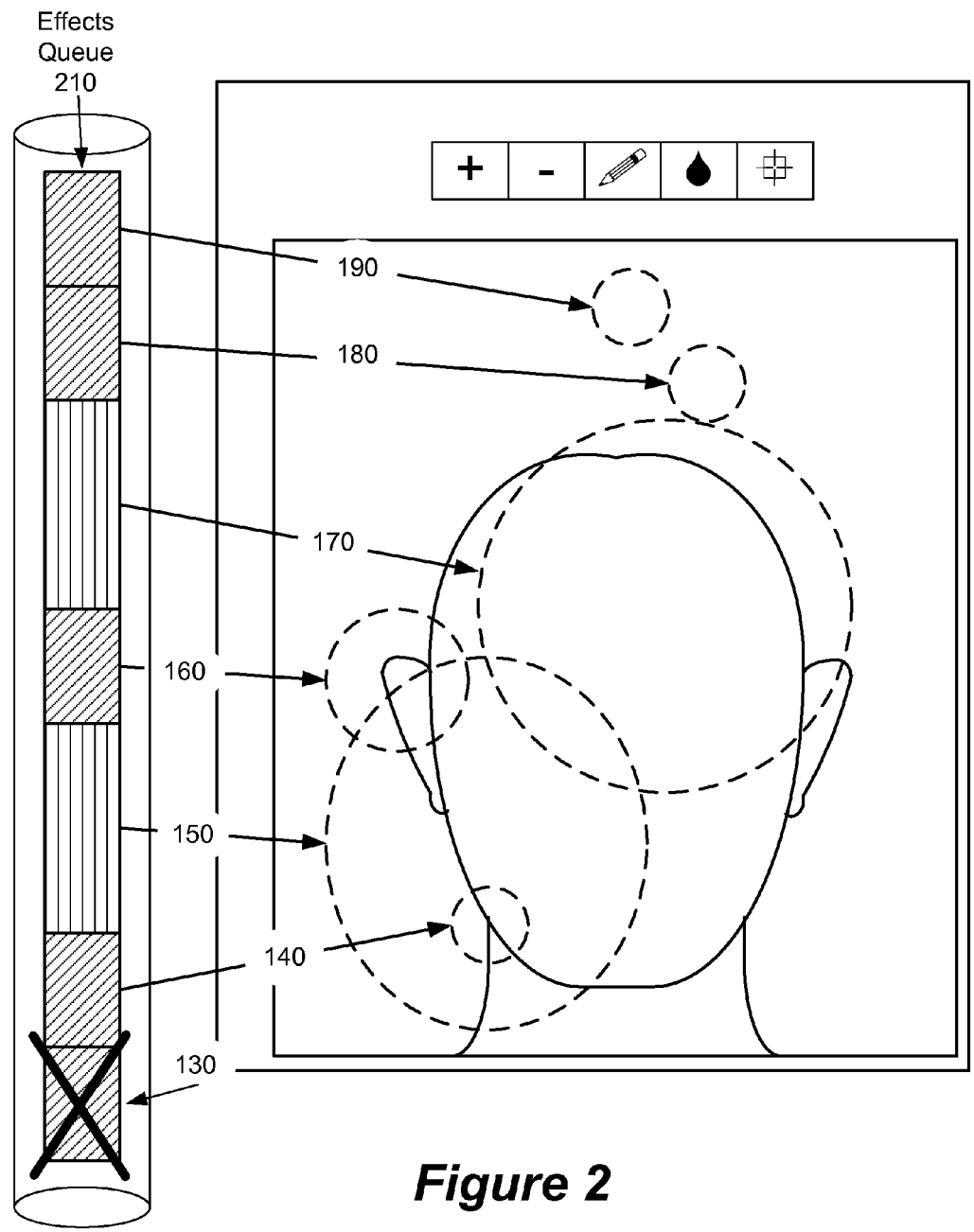
FIG. 2 shows the effects queue after an effect is removed from the image.

FIG. 2 shows an effects queue 210 that represents the effects queue 125 of FIG. 1 after the effect 130 is removed from the image. A user may specify the removal of the effect 130 through an undo keystroke (i.e., Ctrl-Z) or by selecting and removing the effect through a graphical user interface representation of the effects queue that is displayed within an image editing application.

After a user removes or modifies an effect within the effects queue, the image editing application reprocesses all other effects within the list of effects that were previously specified for the image but that have not been removed or modified in order to render the final result. For instance, in FIG. 2, the remaining effects 140-190 must be reapplied to an unmodified version of the original image in order to render the image to include effects 140-190 and the effect 130 removed.

By utilizing the intelligent offloading of effects, some embodiments reduce the time needed to render the final composite image thus improving real-time performance. Similarly, some embodiments reduce the processing resources needed to reapply all the effects to reproduce the image. This is due to the processing resources being better utilized since the processors waste less time waiting for data to arrive. As a result, the processors are less idle.

Figure 3:
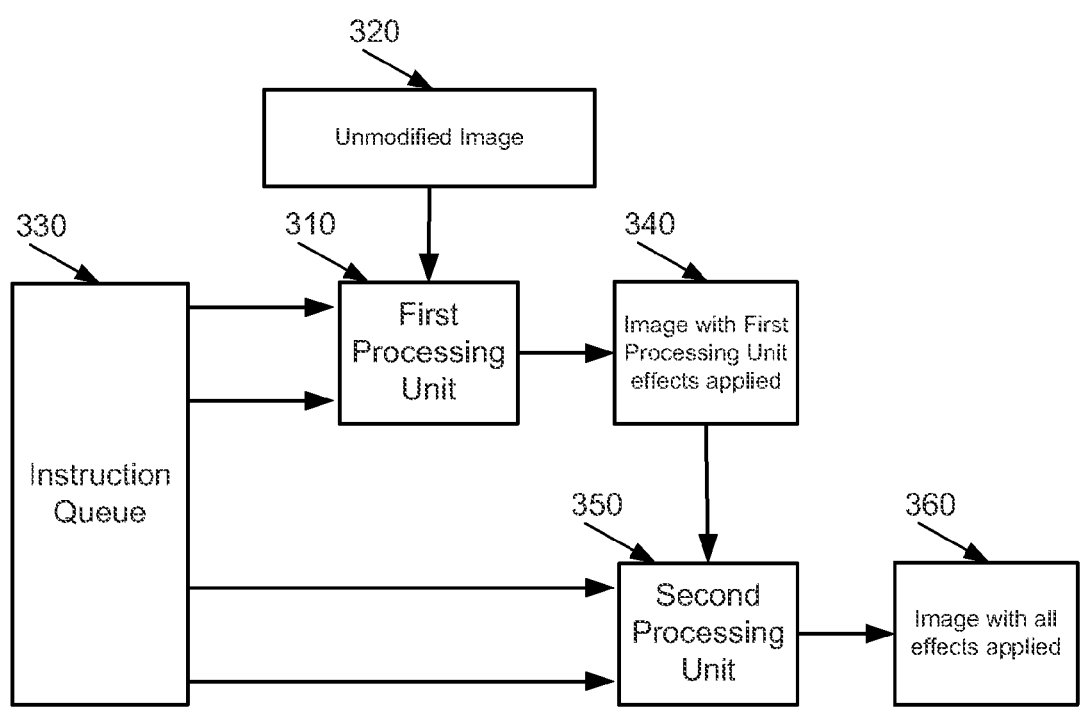
FIG. 3 conceptually illustrates a data flow used by some embodiments to remove the bottleneck involved in reapplying a set of effects to an image when using two separate processing units.

FIG. 3 conceptually illustrates a data flow used by some embodiments to remove the bottleneck involved in reapplying a set of effects to an image when using two separate processing units. In this figure, the first processing unit 310 (i.e., CPU) retrieves an unmodified image 320 and the set of effects from the effects queue 330 to reapply to the unmodified image 320. It should be apparent that in some embodiments the effects queue 330 is physically stored within a cache memory of the first processing unit 310, though in other embodiments the effects queue 330 is stored in memories outside the first processing unit 310 (i.e., in random access memory (RAM)).

The first processing unit 310 analyzes the effects queue to identify and group effects for processing by the first processing unit 310 separate from effects for processing by a second processing unit 350 (i.e., GPU). Such effects may be separated when some or all the first processing unit effects and some or all the second processing unit effects are commutative, associative, or both. More specifically, individual retouch strokes that are included within the first processing unit effect classification are not commutative with respect to each other. However, these and other first processing unit effects are generally commutative with respect to filter operations (e.g., saturation, brightness, or exposure) that are included within the second processing unit effect classification. Therefore, regardless of the order in which a user applies such first processing unit effects and second processing unit effects to an image, some embodiments are able to reapply the effects to the image in a non-contiguous manner where a first set of the effects (i.e., CPU effects) are first processed by the first processing unit before the resulting data is provided to the second processing unit for processing of a second set of the effects (i.e., GPU effects).

In some embodiments, the first processing unit executes a simple program to scan through the effects queue to identify each of the first processing unit effects and second processing unit effects. In some such embodiments, the first processing unit creates two separate smaller queues, one to retain the first processing unit specific effects and one to retain the second processing unit specific effects. In some other embodiments, the effects queue contains a parameter to flag first processing unit specific effects different from second processing unit specific effects so that during processing of the effects within the queue, a check of the parameter flag reveals whether the effect is for processing by the first processing unit or for processing by the second processing unit.

After identifying first processing unit effects and second processing unit effects within the effects queue, the first processing unit 310 processes all first processing unit effects. The first processing unit 310 then passes the resulting data 340 to the second processing unit 350. The second processing unit 350 processes the remaining second processing unit effects to produce the final image 360 with all effects applied. In this manner, only a single data exchange is required between the first processing unit 310 and the second processing unit 350 irrespective of the interleaved first processing unit effects and second processing unit effects within the effects queue 330.

The resulting image reproduced by the out of order processing is the same final result, as if all effects were processed in a contiguous manner. Moreover, the non-contiguous processing of some embodiments avoids the continual data exchange that would otherwise occur between the first and second processing units and thus reduces the associated bottleneck. For example, an effects queue that includes a saturation filter GPU effect, a retouch CPU effect, an exposure filter GPU effect, and a blemish removal CPU effect would require at least three data exchanges between the two processing units when processing the effects in order. Using the out of order processing of some embodiments, the CPU processes both the retouch CPU effect and blemish removal CPU effect before exchanging data with the GPU. The GPU then processes the remaining GPU effects to produce the final result.

In some embodiments, the first processing unit 310 also caches the data resulting from applying the first processing unit effects to the unmodified image. Any adjustment to any one of the second processing unit effects no longer requires reprocessing of the first processing unit effects by the first processing unit 310. Rather, the necessary data is provided from the first processing unit cache to the second processing unit 350. This cached data serves as the starting point for reapplying the second processing unit effects instead of using the unmodified image as the starting point. The second processing unit 350 then reprocesses only the second processing unit effects, resulting in further efficiency gains and better real-time rendering when removing or modifying a previously applied effect of an image.

Similarly, the first processing unit 310 itself may use the cached intermediate image data as a source, allowing iterative first processing unit effects. For instance, if the original image included a bird in the sky and a user desired to make a thousand clones of the bird, some embodiments clone the bird once, then clone two birds, then clone four birds, etc., with a thousand birds cloned after only ten cloning operations.

Figure 4A:
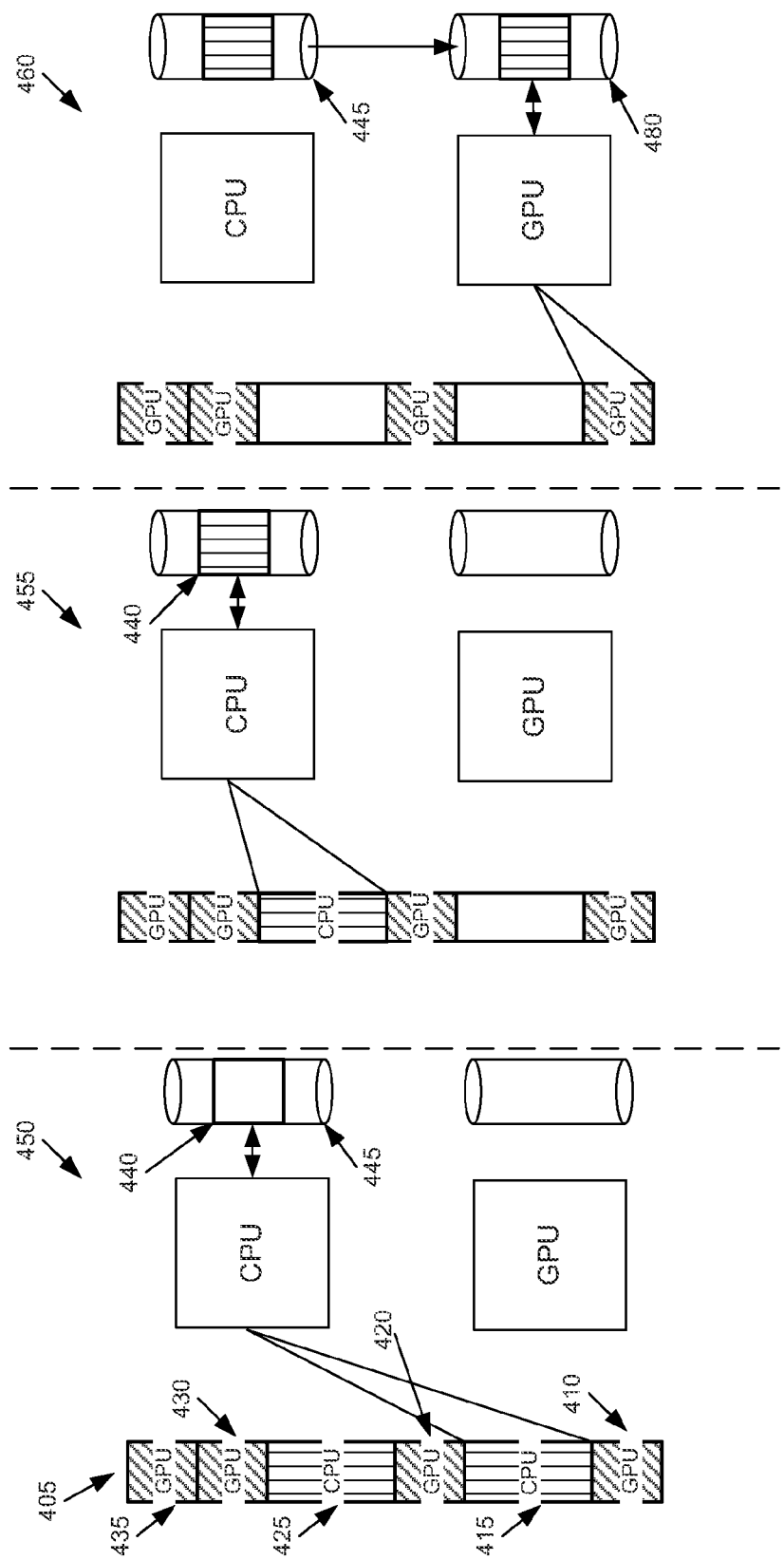
FIG. 4A illustrates the efficient reprocessing of effects by grouping and processing CPU effects prior to processing GPU effects.

FIGS. 4A and 4B further illustrate the data flow in efficiently reapplying a set of effects to an image after at least one effect of the previously applied effects is removed or modified. In FIG. 4A, the effects queue 405 includes four GPU effects 410, 420, 430, and 435 interleaved with two CPU effects 415 and 425. As illustrated in the first and second passes 450 and 455, the CPU processes the CPU effects 415 and 425 and retains the resulting image data 440 within a CPU associated memory buffer 445.

After the first two passes 450 and 455, only GPU effects 410, 420, 430, and 435 remain for processing. Prior to the third pass 460, the resulting image data 440 is transferred to a memory 480 associated with the GPU for subsequent processing of the remaining GPU effects 410, 420, 430, and 435. However, the memory associated with the CPU 445 still retains a copy of the resulting image data. In some embodiments, the memory associated with the GPU includes video RAM that is contained within a video card.

During the third pass 460 of FIG. 4A and the fourth through sixth passes 465-475 of FIG. 4B, the GPU processes each of the remaining GPU effects from the effects queue without further image data exchange occurring between the CPU and GPU. After each such pass, the image data within the GPU associated memory 480 is updated. However, the image data 440 retained within the CPU associated memory 445 does not include any of the GPU processed results. Rather, the CPU associated memory 445 includes only the modifications that resulted from having processed the CPU specific effects. After all instructions within the queue have been processed and applied to the image, a final rendered image is ready for rendering on a display device.

Figure 5:
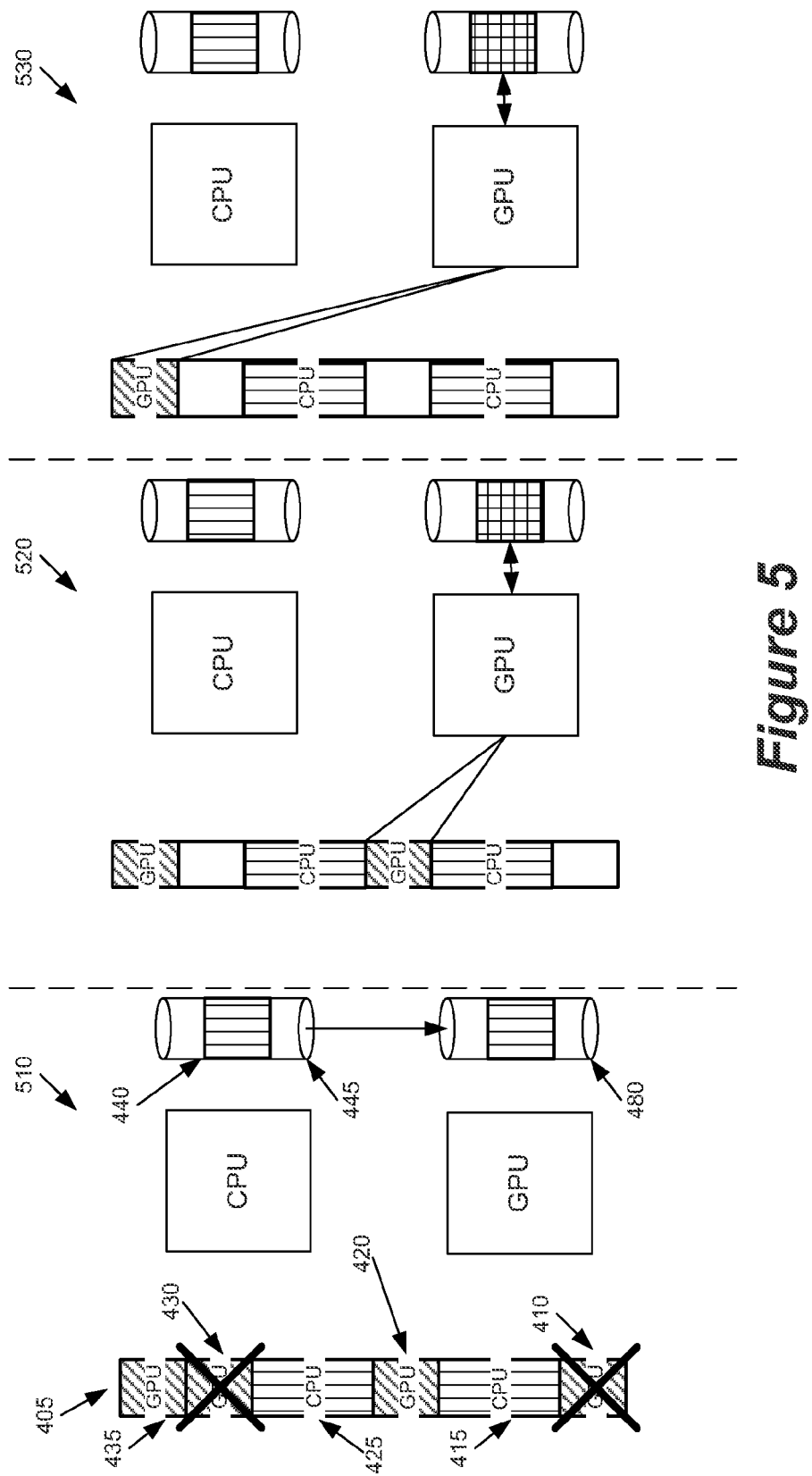
FIG. 5 illustrates using the retained image data within the CPU associated memory in order to avoid having to reprocess all the effects within the effects queue when only GPU effects are subsequently modified (e.g., removed or a parameter for the effect changes).

FIG. 5 illustrates using the retained image data 440 within the CPU associated memory 445 in order to avoid having to reprocess all the effects within the effects queue 405 when only GPU effects are subsequently modified (e.g., removed or a parameter for the effect changes). In this figure, a user has removed two of the GPU effects 410 and 430 that were previously applied to the image during the passes performed in FIGS. 4 and 5. Accordingly, some embodiments reprocess the image by reapplying the remaining GPU effects 435 and 420 to the buffered image data 440 within the CPU associated memory 445. Since the buffered image data 440 already incorporates the changes produced by the CPU effects 415 and 425, these effects need not be reapplied and thus processing resources of the computer system are saved.

During the first pass 510, the buffered image data 440 is passed to the memory associated with the GPU 480. During pass 520, the GPU reprocesses effect 420 and applies the results to the image data received at pass 510. The GPU then reprocesses effect 435 in order to reproduce the final image with the results of effects 410 and 430 removed from the final image. In this manner, some embodiments are able to reproduce an image in real-time or near real-time as some previously applied effects to the image are adjusted. It should be apparent to one of ordinary skill in the art that in some embodiments the same technique applies to reproducing an image when a new second processing unit effect (e.g., GPU effect) is added to the image. In some such embodiments, the retained image data from the first processing unit is sent to the second processing unit in order for the second processing unit to reapply a previously specified set of second processing unit effects and the newly specified second processing unit effect.

Figure 6:
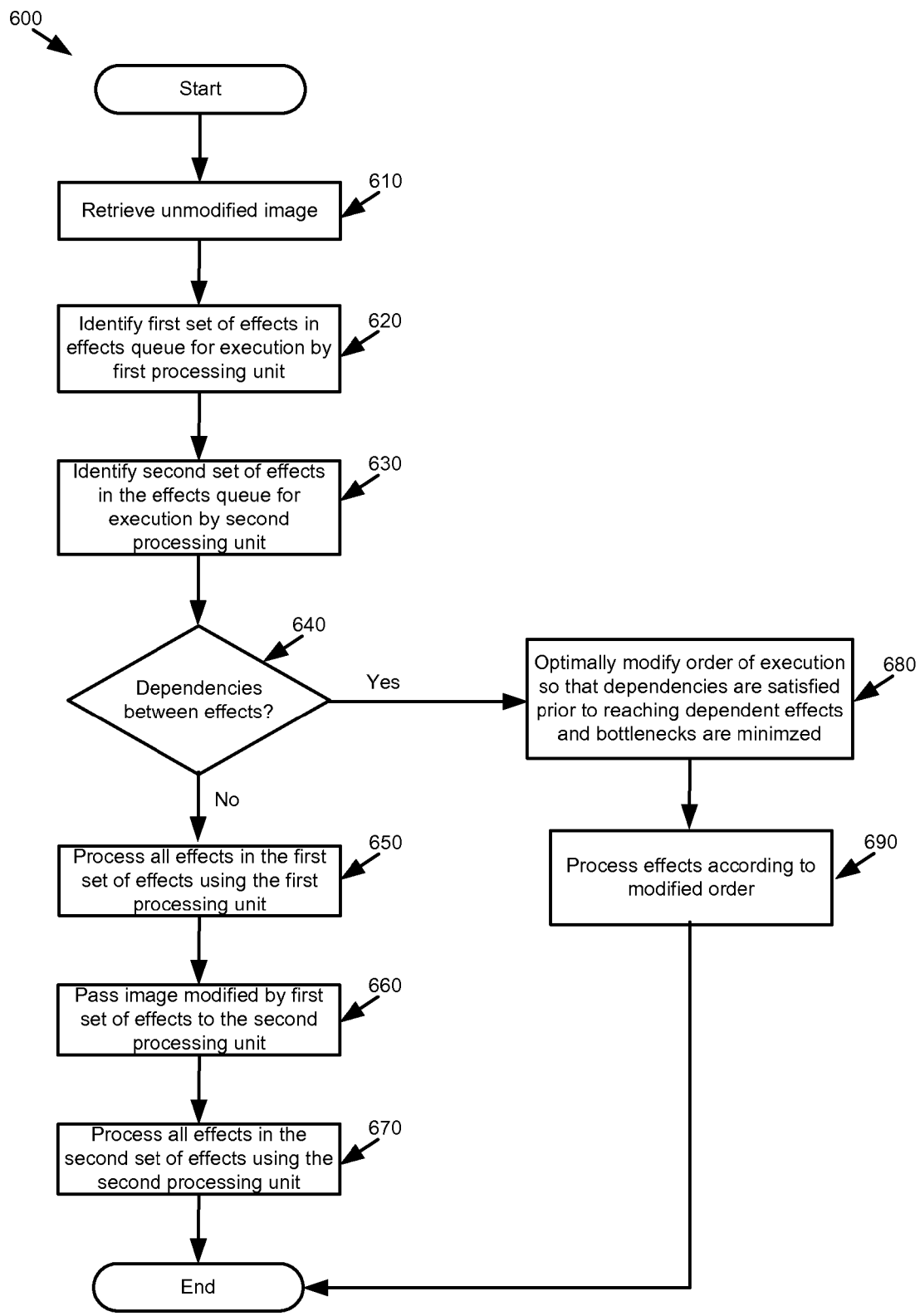
FIG. 6 presents a process for reprocessing an image with multiple effects by optimally reapplying the multiple effects to reproduce the image with at least one effect removed or modified.

FIG. 6 presents a process for reprocessing an image with multiple effects by optimally reapplying the multiple effects to reproduce the image with at least one effect removed or modified. The process 600 begins by retrieving (at 610) an unmodified version of the image that is to have a set effects reapplied to it. In a nondestructive image processing application, the unmodified version will be a duplicate of the original image loaded into the image editing application. In some embodiments, retrieving the unmodified version of the image involves decoding unprocessed RAW image data from the original image into an editable encoding of the image. Different adjustments may be made to the image before the conversion occurs. In some embodiments, the image data is converted to a RGB file format such as TIFF or JPEG.

The process then analyzes an effects queue to identify (at 620) a first set of the effects for optimal processing by a first processing unit. The first processing unit also analyzes the effects queue to identify (at 630) a second set of the effects for optimal processing by a second processing unit. In some embodiments, the first processing unit is the CPU and the second processing unit is the GPU of a computer system. In other embodiments, the first and second processing units are separate CPUs, a single CPU with two separate cores, two GPUs, a CPU with a standalone physics processor, or a GPU with a standalone physics processor.

The first processing unit further analyzes the effects in the effects queue to determine (at 640) whether any of the effects are dependent upon the results of earlier specified effects in order to be rendered properly. In some embodiments, a dependent effect is an effect that is not commutative or associative.

If no dependent effects are found within the effects queue, the first processing unit then proceeds to process (at 650) the first set of effects by applying each effect to the unmodified image retrieved at 610. In this manner, an intermediate image is produced and locally stored in a computer readable medium accessible by the first processing unit. In some embodiments, the computer readable medium includes a cache of the processing unit, RAM, hard disk storage, or removable flash storage.

In some embodiments, the processing (at 650) by the first processing unit only occurs if a removed or modified effect from a set of previously modified effects is an effect that is for processing by the first processing unit or if certain preceding operations are changed (e.g., RAW image decode parameters are changed). If the removed or modified effect is an effect that is for processing by the second processing unit, then no processing occurs at step 650. Instead, the first processing unit utilizes the data stored within the computer readable medium from a previous processing iteration as the processed data.

The first processing unit passes (at 660) the image modified with only the first set of effects to the second processing unit. As stated above, the passed data may include cached data that was processed during a previous iteration but that has not changed since. In some embodiments, the first processing unit also passes the second set of effects and the associated parameters for each of the effects to the second processing unit for processing. The passing involves physically transferring the data over a bus (e.g., Accelerated Graphics Port (AGP) or Peripheral Component Interconnect Express (PCI Express)) connecting the first processing unit to the second processing unit.

The second processing unit processes (at 670) all the effects within the second set of effects by applying each effect to the intermediate image. After 670, the resulting image will contain the results produced by each effect within the effects queue. In some embodiments, the resulting image is displayed using the second processing unit when the second processing unit is a GPU of a video card. Additionally, some embodiments pass the resulting image back to the CPU where further image manipulation may occur through the image editing application.

If dependent effects are found interleaved within the effects, then the process performs (at 680) a reordering of the execution order of the effects such that all interdependencies are satisfied prior to the processing of the one or more dependent effects. Some embodiments perform the reordering in such a manner that minimizes the bottleneck for data exchanges between the first and second processing units.

In order to process (at 690) the effects according to the modified order, some embodiments retrieve the current image data which may have moved to a memory buffer associated with the second processing unit. The first processing unit then processes all effects for processing by the first processing unit to satisfy any first processor interdependencies with a dependent effect. The first processing unit passes the resulting image data to the second processing unit where the second processing unit processes all effects for processing by the second processing unit to satisfy any second processor interdependencies with the dependent effect. In some embodiments, the dependent effect is then processed by the appropriate processing unit. If the appropriate processing unit is the first processing unit, then the image data is passed back to the first processing unit for processing of the dependent effect. If the appropriate processing unit is the second processing unit, then the image data already is retained with the second processing unit and the second processing unit proceeds to process the non-commutative or non-associative effect.

Alternatively, some embodiments refrain from processing the dependent effect until there is a need to do so. For instance, after all prior effects are processed in order to satisfy dependencies with a first processing unit dependent effect, then the modified reordering of instructions for some embodiments specifies grouping additional first and second processing unit effects after the first processing unit dependent effect until another dependent effect is encountered within the effects queue or the final effect is reached. In this manner, the modified reordering efficiently allocates the set of effects in accordance with the data flows of FIGS. 3, 4A, and 4B while still accounting for interdependencies of non-commutative or non-associative effects.

IV. Image Editing Application

Figure 7:
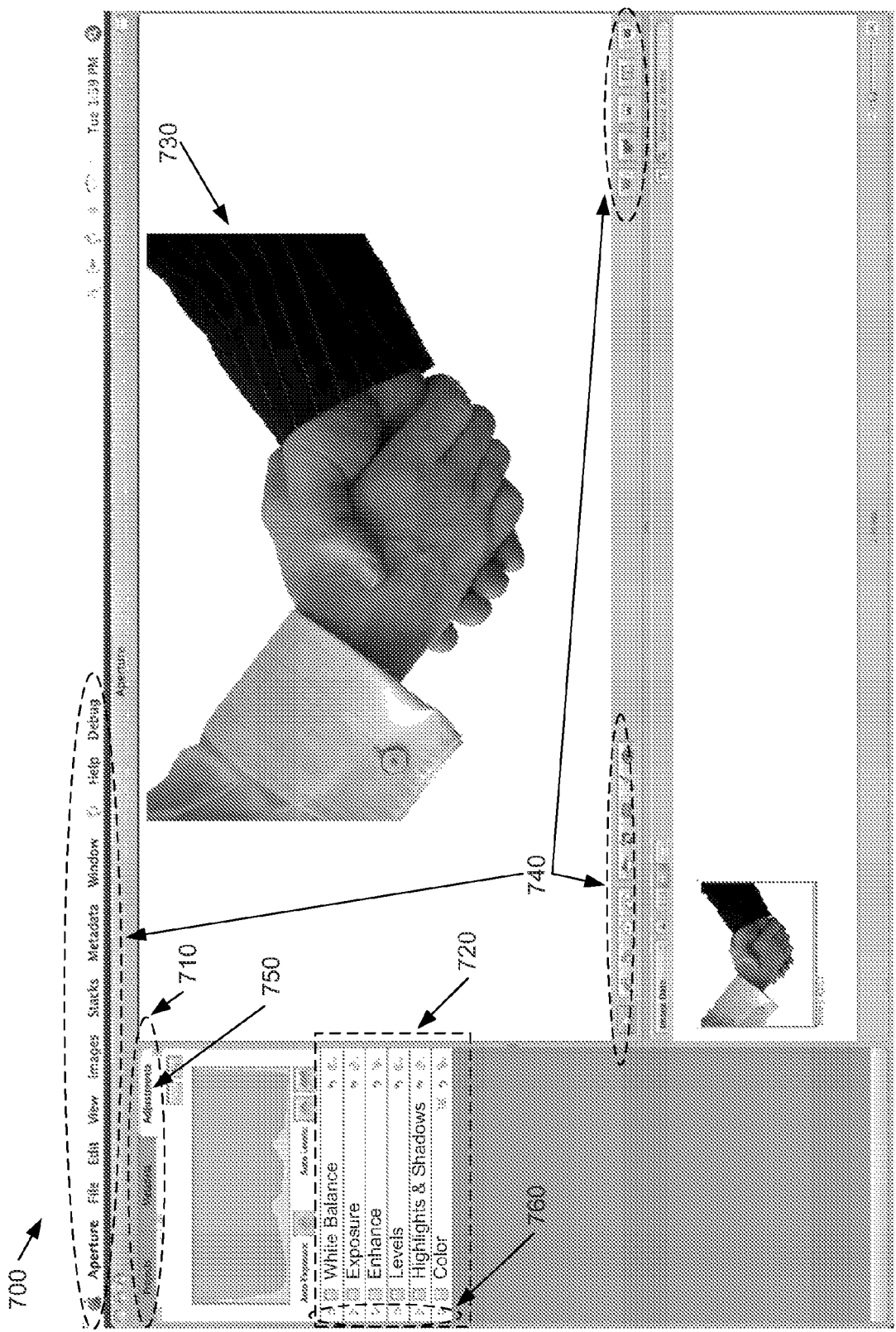
FIG. 7 presents an image editing application in accordance with some embodiments of the invention.

Some embodiments of the invention are applicable to image editing applications that provide undo or modify functionality for any effect within a list of previously applied effects in accordance with some embodiments described above. FIG. 7 presents an example of one such image editing application. The image editing application 700 provides (1) a set of selectable tabs 710 that reveal various effects 720 for modifying an image, (2) a main display window 730 to display the image, and (3) a set of various menu controls and selectable icons 740 to further adjust the image by providing different views of the image or by providing additional functionalities.

The set of selectable tabs 710 provide a means to access data relating to a project, data relating to an image, or effects to apply to the image. The various image editing effects are incorporated within sets of collapsible effects menus 720. Each of the collapsible effects menus 720 contain groups of related effects and parameters for adjusting the result or quality of the effect. Each effect is expandable and collapsible through the selectable user interface items 760.

Figure 8:
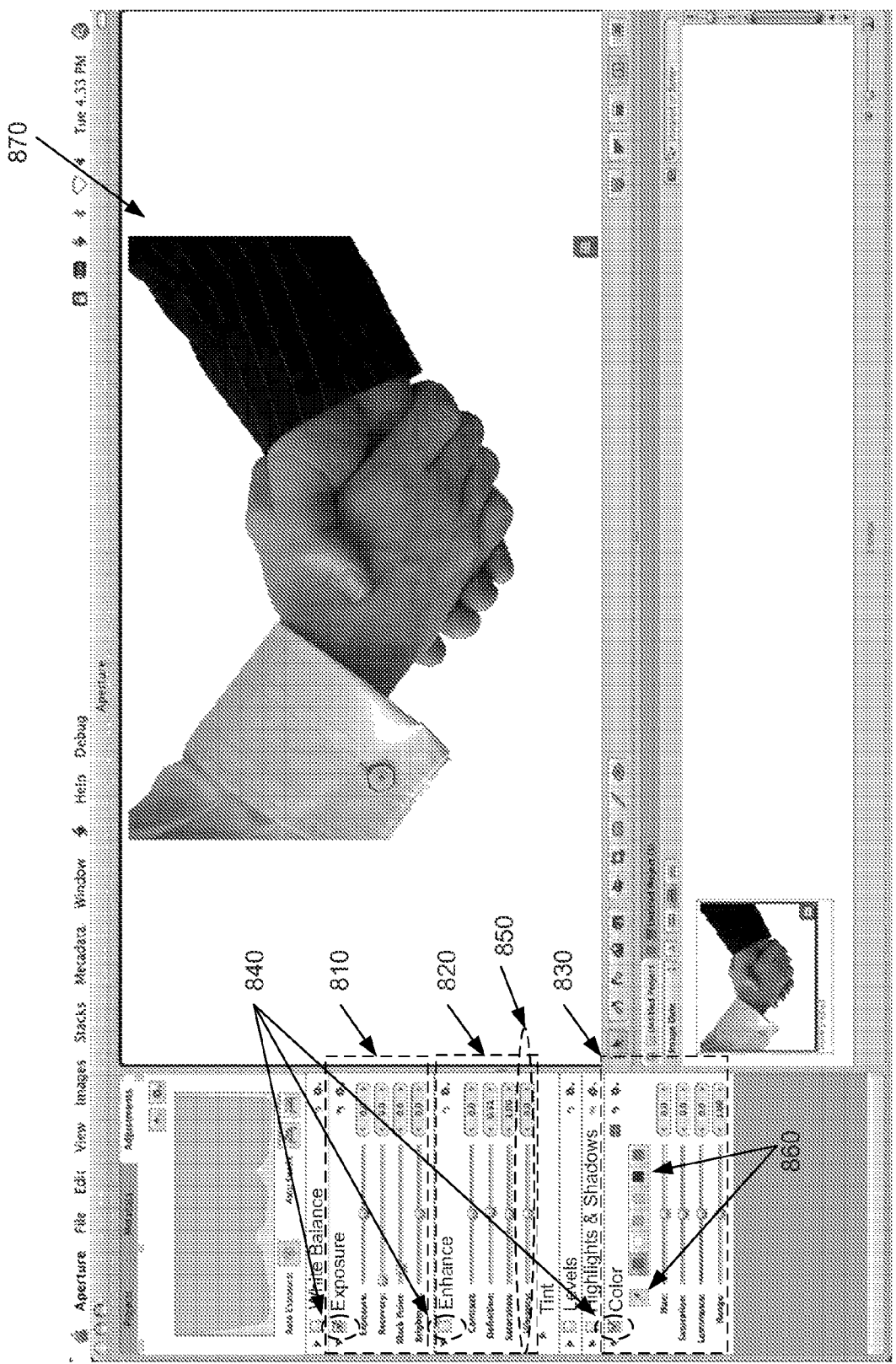
FIG. 8 illustrates the image editing application of FIG. 7 with the collapsible effects menus expanded to show the various effects and parameters for each effect.

FIG. 8 illustrates the image editing application 700 of FIG. 7 with the collapsible effects menus 810, 820, and 830 expanded to show the various effects and parameters for each effect. The effect menu 810 includes four effects, each effect for adjusting a particular exposure setting of the image (e.g., exposure, recovery, black point, and brightness). The effect menu 820 includes four effects that enhance the image by adjusting the contrast, definition, saturation, and vibrancy of the image and the effect menu 830 includes four effects that adjust color settings (e.g., hue, saturation, luminance, and range) of the image. The effect 830 also includes additional image editing tools 860 to select particular colors and provide other functionality. Each of the effects illustrated within FIG. 8 are first processing unit and second processing unit specific effects.

Adjacent to each of the effects within the effects menus are parameters that determine the amount or degree of impact produced by the effect. A user may increase or decrease the impact of a given effect by altering the specified parameter. As illustrated, each effect includes a user interface slider item to adjust the parameter. The user interface slider item represents a range of values where different points along the sliding scale represent different values, each value adjusting the impact of the effect. Adjacent to the user interface slider item is a user interface text item for direct entry of a numerical value. The user interface text item accepts values within the range of values represented by the user interface slider item. Values greater than or less than the acceptable range of values will either be automatically scaled to the next closest acceptable value or will create a prompt to notify the user of the invalid entry. The user interface item is also adjustable using the increasing and decreasing arrows surrounding the numerical value.

Figure 9:
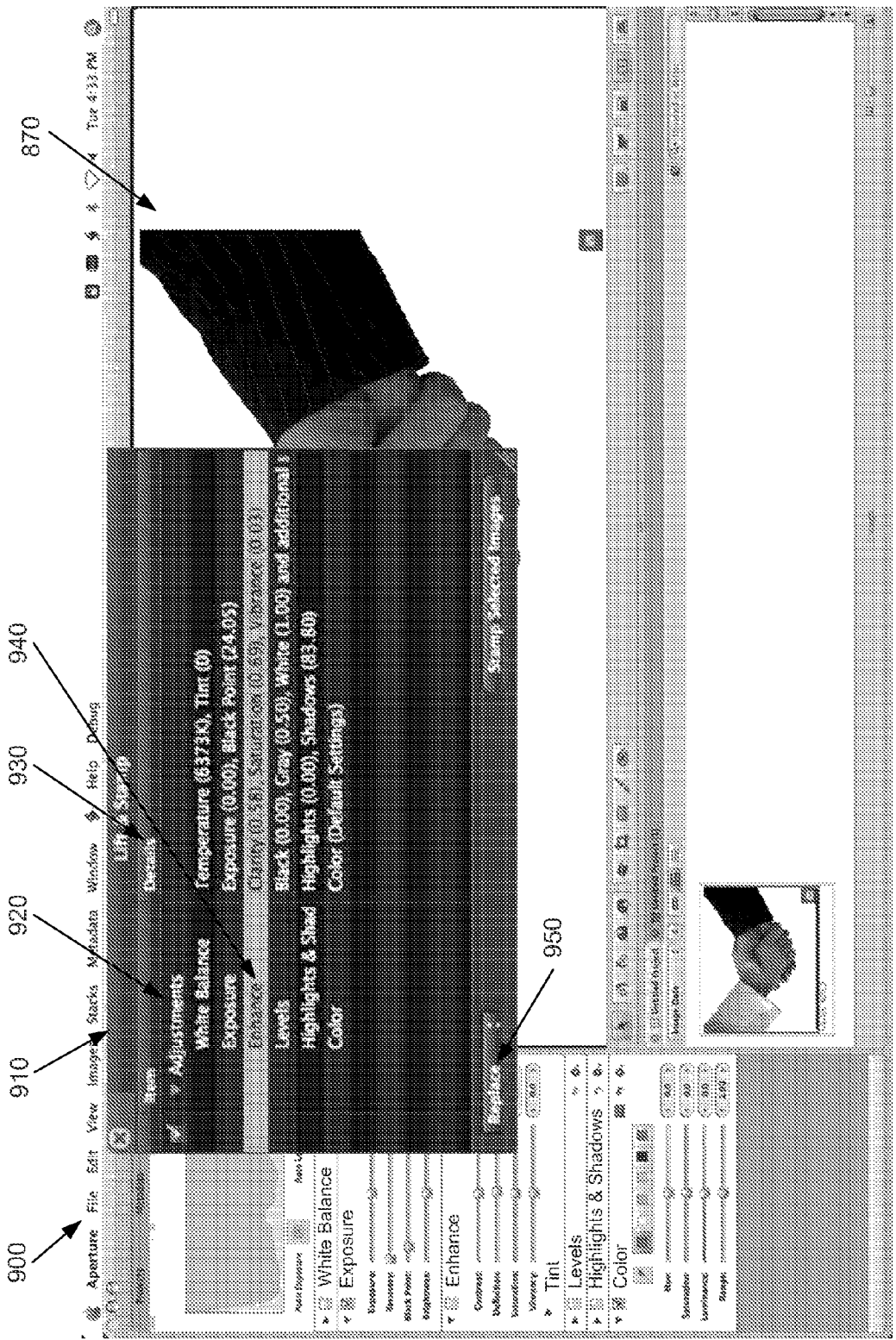
FIG. 9 illustrates an effect queue within an image editing application of some embodiments.

The image editing application of some embodiments tracks the number of effects applied to the image and the parameters associated with each effect within an effects queue. FIG. 9 illustrates an effects queue 910 within an image editing application 900 of some embodiments. In this figure, the effects queue 910 is a popup display window within the image editing application 900. The effects queue 910 identifies the various effects 920 applied to the image and the associated properties 930 for each of the effects 920. Specifically, six different effects are applied to the image.

Figure 10:
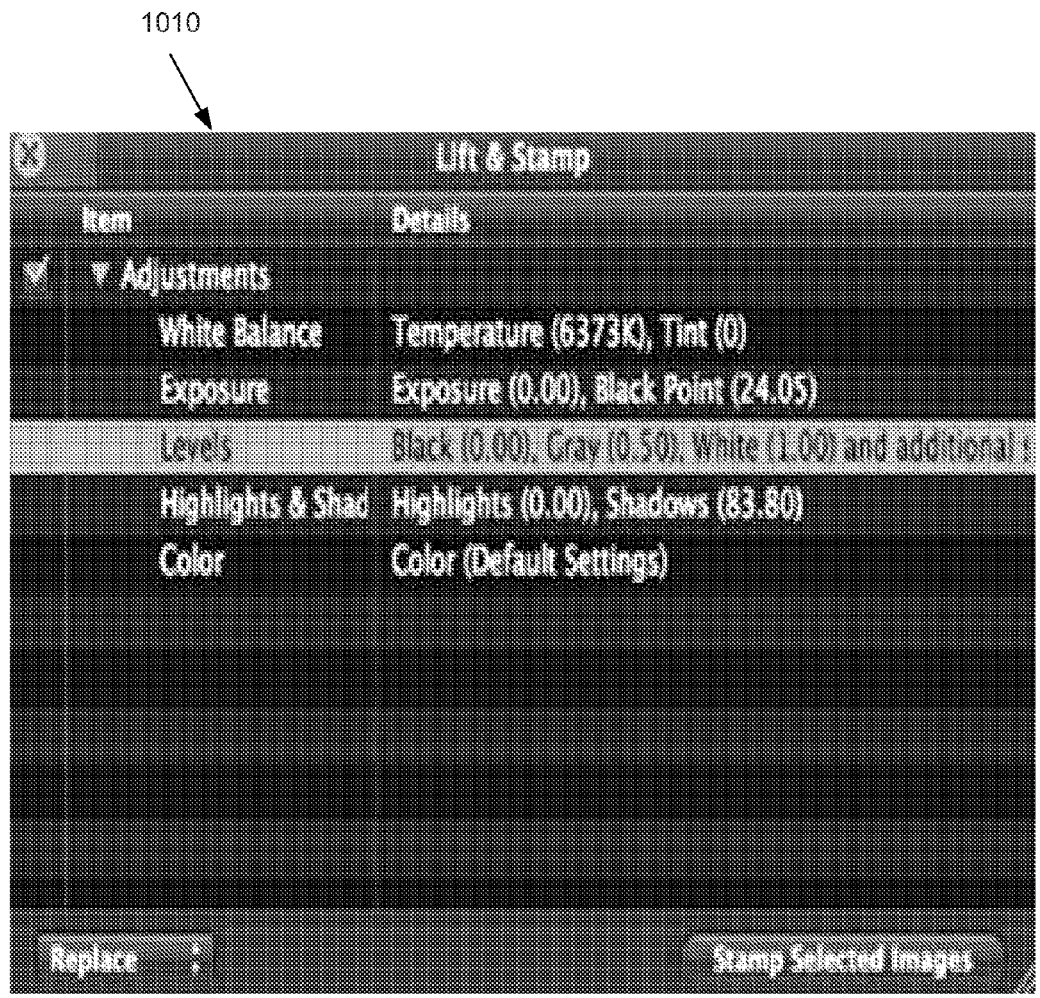
FIG. 10 provides an effect queue that represents the effect queue of FIG. 9 after an effect is removed.

Using the effects queue 910, users are able to remove or modify any previously defined effect by interacting with the selectable user interface item representing the effect. For instance, in FIG. 9, the user has selected the third effect 940. By clicking the user interface item 950 or by pressing a shortcut keystroke (i.e., the delete key of the keyboard), the user is able to remove the effect causing the image editing application to render the image without the removed effect. FIG. 10 provides an effect queue 1010 that represents the effect queue 910 of FIG. 9 after the effect 940 is removed. The effects queue 1010 includes only five remaining effects that need to be applied to the image.

Though removing an effect from an effects queue 910 is visually represented in FIG. 9, it should be apparent to one of ordinary skill in the art that effects may be added or removed from an image without direct interaction with the effects queue 910. For instance, using specified keystrokes, users are able to remove the last effect applied to the image (i.e., Ctrl-Z undo keystroke), a particular effect that is not the last applied effect (i.e., Ctrl-Z+3 where the integer specifies the effect within the queue to remove), or multiple effects. Some embodiments of the image editing application permit users the ability to customize and define the keystrokes for performing these and other undo operations.

Figure 11:
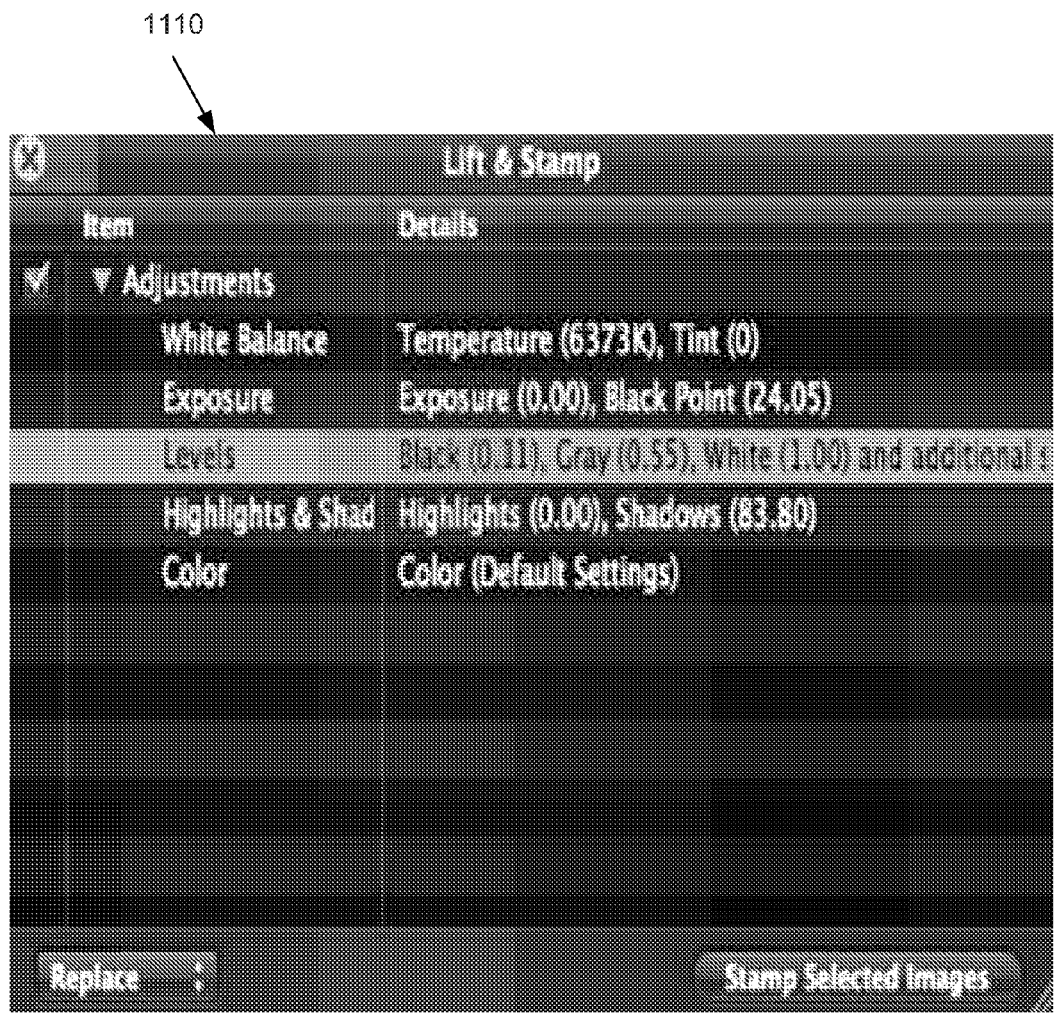
FIG. 11 illustrates an effect queue that illustrates the effects queue of FIG. 10 after a user modifies parameters for a particular effect.

The effects queues 910 and 1010 also permit users the ability to modify previously set parameters for any particular effect within the effects queues 910 and 1010. FIG. 11 illustrates an effects queue 1110 that illustrates the effects queue 1010 after a user modifies the parameters for the effect 1020. Specifically, the black level has increased from 0.00 to 0.11 and the gray level has increased from 0.50 to 0.55. After modification of a previously set parameter, the image editing application will utilize the process 600 of FIG. 6 to render the image with all specified effects and all modified parameters.

To reproduce the image, some embodiments of the image editing application store an unmodified version of the image (i.e., no applied effects) and reapply the remaining effects within the effects queue to a redundant copy of the unmodified image. In some embodiments, this is referred to as nondestructive image processing in which the original unmodified image is never modified. Rather, the redundant copy of the original unmodified image that is created and stored alongside the unmodified image is loaded into the image editing application. The image editing application renders all effects to the redundant copy. Therefore, if a user specifies removing an effect or modifying an effect at any time, the image editing application may simply discard the redundant copy and create another duplicate from the original unmodified image on which to reapply the effects. Nondestructive image processing is a feature of many image editing applications such as Apple Aperture®.

In some embodiments, the image editing application has several additional functionalities in addition to those described above. For instance, in some embodiments, the image editing application provides a set of tools for (1) organizing images into different collections of images (e.g., different digital photo albums), (2) organizing the images by tagging images with informative keywords, (3) organizing the images by marking selected images as favorites, or (4) organizing the images by rating each image. The image editing application can also publish images into a "photo book" of images, publish the images on the World Wide Web, or publish the images as individual image prints.

Each photo book has several pages that have one or more picture fields for presenting pictures. Different photo books can differ in their size, themes, covers, page designs, page colors, picture-field designs, picture-field layouts, and/or other attributes. In some embodiments, a user can modify the page design, color, frame design, and/or other thematic aspects of a selected photo books. Also, in some embodiments, the user can add picture and text fields to the photo book. Examples of image editing applications with such additional functionality include Apple iPhoto® and Apple Aperture®.

V. Computer System

Figure 12:
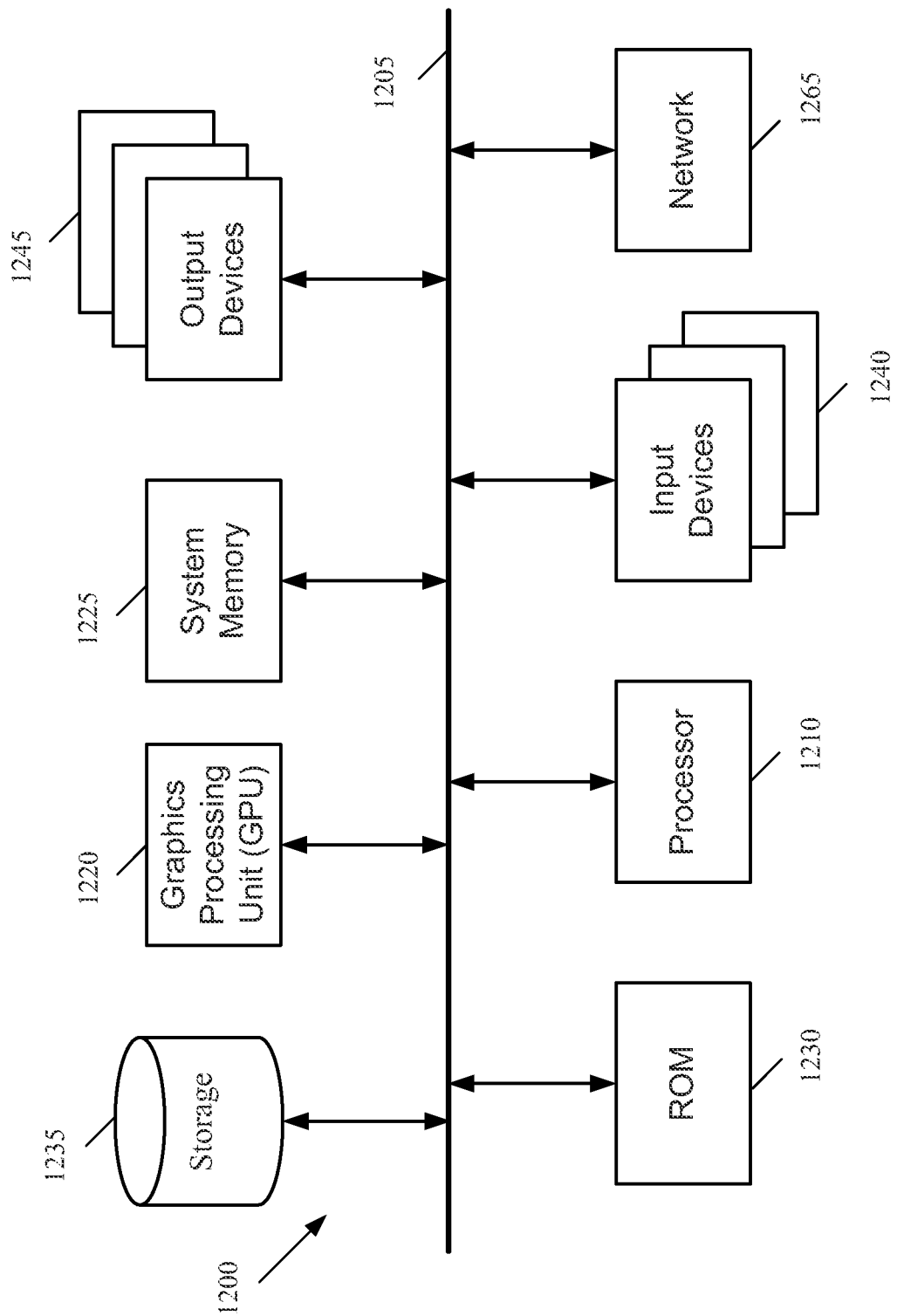
FIG. 12 is a block diagram of an illustrative computing system suitable for implementing an embodiment of the present invention.

FIG. 12 illustrates a computer system with which some embodiments of the invention are implemented. Computer system 1200 includes a bus 1205, a processor 1210, a graphics processing unit (GPU) 1220, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processor 1210 with the read-only memory 1230, the GPU 1220, the system memory 1225, and the permanent storage device 1235.

From these various memory units, the processor 1210 retrieves instructions to execute and data to process in order to execute the processes of the invention. Some instructions are passed to and executed by the GPU 1220. As noted above, the GPU 1220 can offload various computations or complement the image processing provided by the processor 1210. Such functionality can be provided using CoreImage's kernel shading language.

The read-only-memory (ROM) 1230 stores static data and instructions that are needed by the processor 1210 and other modules of the computer system. The permanent storage device 1235, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a floppy disk or ZIP® disk, and its corresponding disk drive) as the permanent storage device. Like the permanent storage device 1235, the system memory 1225 is a read-and-write memory device. However, unlike storage device 1235, the system memory is a volatile read-and-write memory, such as random access memory. The system memory stores some of the instructions and data that the processor needs at runtime. In some embodiments, the invention's processes are stored in the system memory 1225, the permanent storage device 1235, and/or the read-only memory 1230.

The bus 1205 also connects to the input and output devices 1240 and 1245. The input devices enable the user to communicate information and select commands to the computer system. The input devices 1240 include alphanumeric keyboards and pointing devices. The output devices 1245 display images generated by the computer system. For instance, these devices display a graphical user interface. The output devices include printers and display devices, such as cathode ray tubes (CRT) or liquid crystal displays (LCD).

Finally, as shown in FIG. 12, bus 1205 also couples computer 1200 to a network 1265 through a network adapter (not shown). In this manner, the computer can be a part of a network of computers (such as a local area network ("LAN"), a wide area network ("WAN"), or an Intranet, or a network of networks, such as the internet. For example, the computer 1200 may be coupled to a web server (network 1265) so that a web browser executing on the computer 1200 can interact with the web server as a user interacts with a graphical user interface that operates in the web browser.

While the invention has been described with reference to numerous specific details, one of ordinary skill in the art will recognize that the invention can be embodied in other specific forms without departing from the spirit of the invention. For instance, some effects provided by the image editing application are omitted from being classified as either first processing unit or second processing unit specific effects and are thus processed differently. In some embodiments, a red-eye correction CPU effect is one such omitted effect. Red-eye removal is not commutative with general exposure correction, a GPU effect. Since general exposure correction is typically applied to the RAW image data, the red-eye correction would then have to be reapplied after applying the exposure correction. The exposure correction is a setting that can be modified at any time and thus the red-eye correction would have to be reapplied each time a change is made to the exposure correction. This dependency would create unnecessary processing delays and is therefore an example of an effect that is treated differently.

Some embodiments of the invention have been described with reference to CPUs and GPUs of a computer system. However, any electronic device including two processing units is adaptable to perform some embodiments of the invention. Moreover, a processing unit of some embodiments includes virtual or emulated processing units whereby software constructs logically divide a single physical processor to function as if it was two separate processing units or employ distributive computing where the processing units are physically distributed across two separate devices connected over a network.

Additionally, some embodiments have been described in conjunction with the Apple Mac OS® environment and Apple Aperture® tools, though a person of ordinary skill in the art would realize that the invention may be practiced in other operating environments such as Microsoft Windows®, UNIX, Linux, etc., and other applications such as Adobe Photoshop®, Adobe Lightroom®, Apple iPhoto®, etc., without the use of these specific details. The examples have referenced the application of effects to images, but each of the above examples are extensible to apply to other forms of visual media such as video. Thus, one of ordinary skill in the art would understand that the invention is not to be limited by the foregoing illustrative details, but rather is to be defined by the appended claims.

We claim:

1. A method, comprising:
    accessing a previously-defined sequence of a plurality of effects for applying the plurality of effects to an image, the previously-defined sequence having a first ordering for applying the plurality of effects to the image that requires a plurality of data exchanges between a first processing unit and a second processing unit;
    analyzing the previously-defined sequence of the plurality of effects to reduce a quantity of the plurality of data exchanges between the first processing unit and the second processing unit, wherein said analyzing comprises:
        determining a second ordering for applying a first subset of the effects to the image by the first processing unit, and
        determining a third ordering for applying a second subset of the effects to the image by the second processing unit after the first subset of effects has been applied to the image by the first processing unit,
        wherein at least one pair of effects that are adjacent effects in either the second or third ordering are not adjacent effects in the first ordering, and
        wherein the second ordering and the third ordering are determined such that the quantity of the plurality of data exchanges between the first processing unit and the second processing unit is reduced;
    using the first processing unit to apply the first subset of the effects to the image according to the second ordering; and
    using the second processing unit to apply the second subset of the effects to the image according to the third ordering.

2. The method of claim 1, wherein the first and second processing units are processing units of a particular computer system.

3. The method of claim 2, wherein the first processing unit is a central processing unit and the second processing unit is a graphics processing unit of the particular computer system.

4. The method of claim 1, wherein the first subset of the effects comprises a portion of the effects in the first ordering and the second subset of effects comprises a remaining portion of the effects in the first ordering.

5. The method of claim 1, wherein identification of the first and second subsets of effects are performed in response to a removal of an effect from the plurality of effects to apply to the image.

6. The method of claim 1, wherein identification of the first and second subsets of effects are performed in response to an adjustment to a parameter of an effect in the plurality of effects, wherein said parameter comprises an amount or quality of the effect to apply to the image.

7. The method of claim 1, wherein the second processing unit applies the second subset of the effects to the image more efficiently than the first processing unit.

8. The method of claim 1, wherein the first subset of the effects comprises a blemish removal effect.

9. The method of claim 8, wherein the second subset of the effects comprises at least one of a saturation adjustment effect, a brightness adjustment effect, an exposure adjustment effect, and a contrast adjustment effect.

10. The method of claim 1, wherein the first processing unit applies the first subset of the effects by applying the first subset of the effects to the image only when an effect in the first subset of the effects is modified.

11. The method of claim 10, further comprising:
    storing processed data obtained from applying the first subset of effects prior to applying the second subset of effect; and
    passing to the second processing unit the processed data comprising the image having the first subset of effects applied before using the second processing unit to apply the second subset of the effects to the image.

12. The method of claim 1 further comprising displaying the image with the plurality of effects.

13. The method of claim 1, wherein each data exchange between the first and second processing units comprises an interval of time needed to pass data over a bus connecting the two processing units.

14. An electronic device for processing an image, the electronic device comprising:
    a first processing unit;
    a second processing unit; and
    a storage storing a program, the program comprising sets of instructions for
        (i) accessing a previously-defined sequence of a plurality of effects for applying the plurality of effects to an image, the previously-defined sequence having a first ordering for applying the plurality of effects to the image that requires a plurality of data exchanges between a first processing unit and a second processing unit,
        (ii) analyzing the previously-defined sequence of the plurality of effects to reduce a quantity of the plurality of data exchanges between the first processing unit and the second processing unit, wherein said analyzing comprises:
            determining a second ordering for applying a first subset of the effects to the image by the first processing unit, and
            determining a third ordering for applying a second subset of the effects to the image by the second processing unit after the first subset of effects has been applied to the image by the first processing unit,
            wherein at least one pair of effects that are adjacent effects in either the second or third ordering are not adjacent effects in the first ordering, and
            wherein the second ordering and the third ordering are determined such that the quantity of the plurality of data exchanges between the first processing unit and the second processing unit is reduced,
(iii) using the first processing unit to apply the first subset of the effects to the image according to the second ordering, and
(iv) using the second processing unit to apply the second subset of the effects to the image according to the third ordering.

15. The electronic device of claim 14 further comprising a display for displaying the image with the plurality of effects after the second processing unit applies the second subset of the effects to the image.

16. The electronic device of claim 14, wherein the program identifies the first and second subsets in response to a removal of an effect from the plurality of effects to apply to the image.

17. The electronic device of claim 14, wherein the program identifies the first and second subsets in response to an adjustment to a parameter of an effect in the plurality of effects, wherein said parameter comprises an amount or quality of the effect to apply to the image.

18. The electronic device of claim 14 further comprising first and second memories, wherein the first processing unit stores into the first memory a first image data generated by applying the first subset of the effects to the image, wherein the second processing unit processes retrieves the first image data from the first memory and stores into the second memory a second image data generated by applying the second subset of the effects to the first image data.

19. A method for applying effects to an image, the method comprising:
accessing a previously-defined sequence of a plurality of effects for applying the plurality of effects to the image, the previously-defined sequence having a first sequence for applying the plurality of effects to the image that requires a plurality of data exchanges between a first processing unit and a second processing unit;
analyzing the previously-defined sequence of the plurality of effects to reduce a quantity of the plurality of data exchanges between the first processing unit and the second processing unit, wherein said analyzing comprises:
determining a first set of effects to assign to the first processing unit for applying the first set of effects to the image according to a second sequence, wherein at least two effects in the first sequence correspond to two consecutive effects in the second sequence with at least one intervening effect between the at least two effects in the first sequence; and
determining a second set of effects to assign to the second processing unit for applying the second set of effects to the image according to a third sequence;
wherein the second sequence and the third sequence are determined such that the quantity of the plurality of data exchanges between the first processing unit and the second processing unit is reduced.

20. The method of claim 19 further comprising passing data from the first processing unit to the second processing unit after the first processing unit applies the first set of effects to the image.

21. The method of claim 19 further comprising displaying the image with the plurality of effects.

22. The method of claim 19, wherein the first set of effects comprises a portion of the effects in the first sequence and the second set of effects comprises a remaining portion of the effects in the first sequence.

23. The method of claim 19, wherein the image is retained within a computer readable medium associated with the first processing unit during processing of the second set of effects by the second processing unit, wherein prior to the second processing unit applying the second set of effects to the image, the image is passed from the computer readable medium associated with the first processing unit to a computer readable medium associated with the second processing unit.

24. A non-transitory computer readable medium storing a program which when executed by at least one processing unit applies effects to an image, the program comprising sets of instructions for:
accessing a previously-defined sequence of a plurality of effects for applying the plurality of effects to the image, the previously-defined sequence having a first sequence for applying the plurality of effects to the image that requires a plurality of data exchanges between a first processing unit and a second processing unit;
analyzing the previously-defined sequence of the plurality of effects to reduce a quantity of the plurality of data exchanges between the first processing unit and the second processing unit, wherein said analyzing comprises:
determining a first set of effects to assign to the first processing unit for applying the first set of effects to the image according to a second sequence, wherein at least two effects in the first sequence correspond to two consecutive effects in the second sequence with at least one intervening effect between the at least two effects in the first sequence; and
determining a second set of effects to assign to the second processing unit for applying the second set of effects to the image according to a third sequence;
wherein the second sequence and the third sequence are determined such that the quantity of the plurality of data exchanges between the first processing unit and the second processing unit is reduced.

25. The method of claim 1, wherein identifying the first subset of effects comprises identifying each effect for processing by the first processing unit that does not depend on result data from at least one other effect that is for processing by the second processing unit.

* * * * *